US007054442B2

(12) United States Patent
Weikle

(10) Patent No.: US 7,054,442 B2
(45) Date of Patent: May 30, 2006

(54) WALL MOUNTED DSL ADAPTER JACK WITH LATCHES FOR ATTACHMENT

(75) Inventor: Owen B. Weikle, Hutchinson, MN (US)

(73) Assignee: Communication System, Inc., Hector, MN (US)

( * ) Notice: Subject to any disclaimer, the term of this patent is extended or adjusted under 35 U.S.C. 154(b) by 310 days.

(21) Appl. No.: 10/630,540

(22) Filed: Jul. 30, 2003

(65) Prior Publication Data

US 2004/0022387 A1 Feb. 5, 2004

Related U.S. Application Data

(60) Provisional application No. 60/400,601, filed on Aug. 2, 2002.

(51) Int. Cl.
*H04M 1/00* (2006.01)

(52) U.S. Cl. ................ 379/438; 379/428.01; 439/536; 439/545; 439/546

(58) Field of Classification Search ................ 379/438, 379/428.01; 439/536, 545, 546
See application file for complete search history.

(56) References Cited

U.S. PATENT DOCUMENTS 4,411,485 A 10/1983 Wiseheart et al. ...... 339/125 R
6,186,826 B1 * 2/2001 Weikle ........................ 439/536
2003/0048895 A1 * 3/2003 Kiko et al. ............ 379/428.01

OTHER PUBLICATIONS

Specification Sheet (2 pages) , Excelsus Z-Blocker Z-200CW, Published prior to May 2003 (admitted prior art).
Copy of back of prior art of Z-200 CW Excelsus Wall Filter.
Copy of front of prior art of Z-200 CW Excelsus Wall Filter.
Specification Sheet (2 pages of Excelsus Z-Blocker, Z-330 TGA and Z-330 CWA, published prior to May 2003—admitted prior art).
Photo 1 of Interior of prior art Z-330 CWA Excelsus Wall Filter (admitted prior art).

(Continued)

*Primary Examiner*—Ahmad F. Matar
*Assistant Examiner*—Quynh H. Nguyen
(74) *Attorney, Agent, or Firm*—Westman, Champlin & Kelly, P.A.

(57) ABSTRACT

An adapter for connection to telephone lines to provide a filter for DSL connections to the telephone lines has pivoting latches that will engage existing studs on a wall mounted jack plate. The housing has a circuit board with a connector that will plug into the telephone jack on the wall mounted jack plate, and has outlet jacks for connection to remote equipment. The latches pivot between a released position wherein they clear the existing studs so that the housing can be placed against the existing wall mounted jack plate, and a latched position where the latches are held in place on the studs and the housing is supported on the existing jack plate. Studs provided on the housing replicate the position of the studs on the existing jack plate.

13 Claims, 9 Drawing Sheets

OTHER PUBLICATIONS

Photo 2 of Interior of prior art Z-330 CWA Excelsus Wall Filter (admitted prior art).
Photo 3 of end of Z-330 CWA Excelsus Wall Filter (admitted prior art).
Photo 4 of end of Z-330 CWA Excelsus Wall Filter with holder open (admitted prior art).

* cited by examiner

WALL MOUNTED DSL ADAPTER JACK WITH LATCHES FOR ATTACHMENT

CROSS REFERENCE TO RELATED APPLICATION

This application is based on, refers to and claims priority on Provisional Patent Application Ser. No. 60/400,601, filed Aug. 2, 2002, the content of which is hereby incorporated by reference.

BACKGROUND OF THE INVENTION

The present invention relates a wall mounted adapter jack that adds a DSL filtering circuit to a wall mounted telephone plate that has headed studs normally used for mounting a phone. The wall mounted DSL adapter jack of the present invention has a base that latches onto the existing phone mounting studs using pivoting latches, and supports a filter circuit and a jack for receiving a telephone plug. A cover plate goes over and is supported on the base wall, and in the present invention studs for supporting a phone on the cover are provided.

The so-called “630 style” kitchen jack has long been made, and is very popular. It uses a wall plate such as that shown in U.S. Pat. No. 4,411,485. The wall plate in patent ’485 has studs for holding a telephone. In one case a filter device adapter made by Excelsus Technologies, utilizes sliding studs at the top and bottom that will hold onto the existing studs of a wall plate and provide a filter circuit connected to an output jack on a cover. At present, it is desirable to provide DSL filtering on the phone lines, since DSL usage has expanded.

Prior art devices have used metal threaded studs that support the telephone. The studs on the adapter are used for holding a telephone with a keyhole type support.

SUMMARY OF THE INVENTION

The present invention relates to a molded adapter assembly comprising a wall mounted, DSL filter jack, mountable on what is commonly called a “630 style kitchen jack” that includes latch arms supported onto a base and capable of pivoting for receiving and latching onto studs of a wall mounted telephone jack. The base carries supports for a PC board having a DSL filter and an output telephone jack. A cover is attached to the base and studs are provided that can be used for supporting a wall phone in place.

The unit is easily molded, and by coring the studs from the back, they can be molded in place. The pivotable latches provide a rapid, easily made structure that is also easily assembled onto a wall plate. The output jack on the adapter is connected to the existing wall jack through a DSL line filter.

DETAILED DESCRIPTION OF THE PREFERRED EMBODIMENTS

Figure 1:
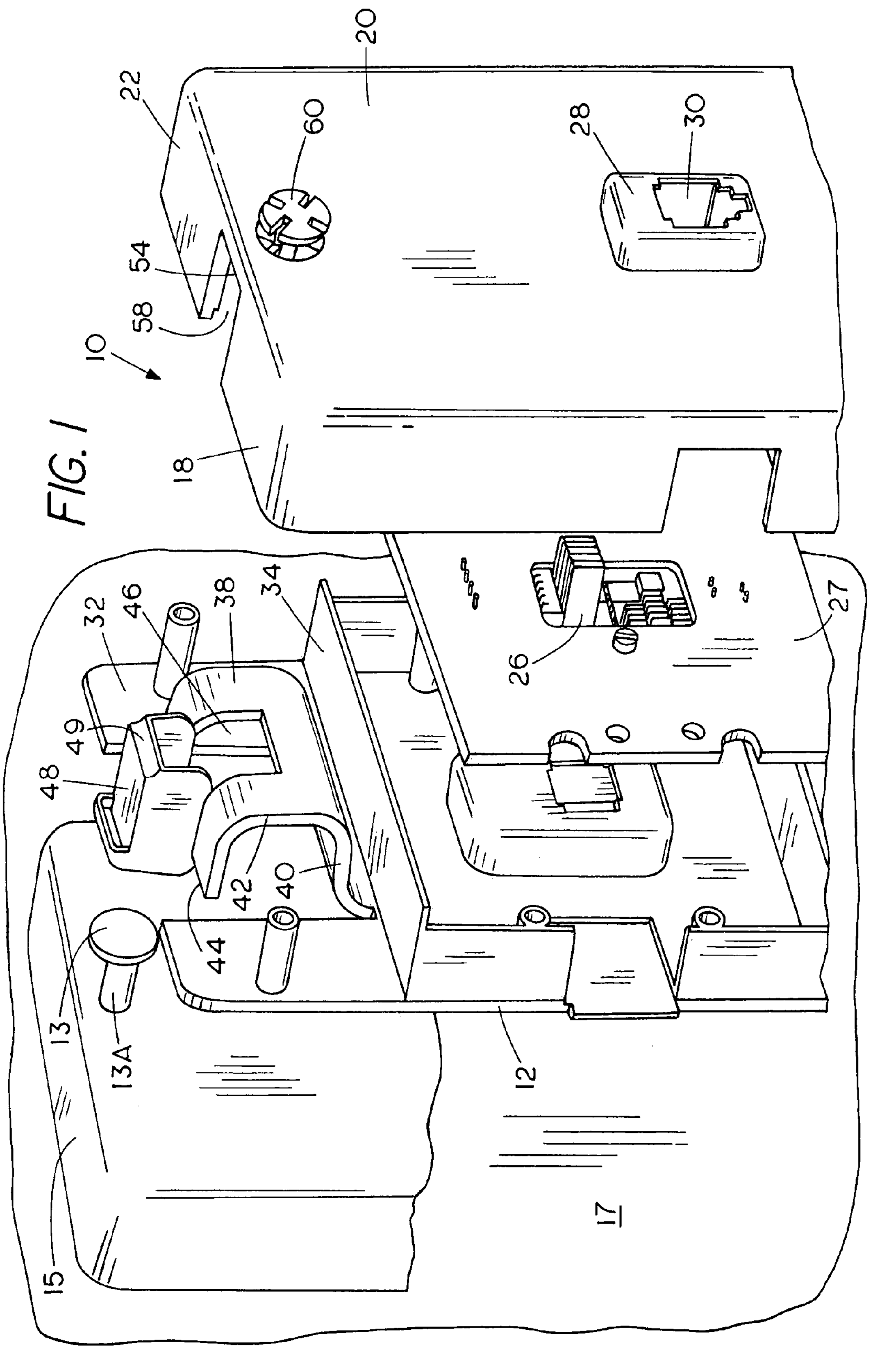
FIG. 1 is an illustrative view of an adapter wall plate and cover adjacent each other and shown about to be installed on an existing wall phone mount in an exploded form.
Figure 2:
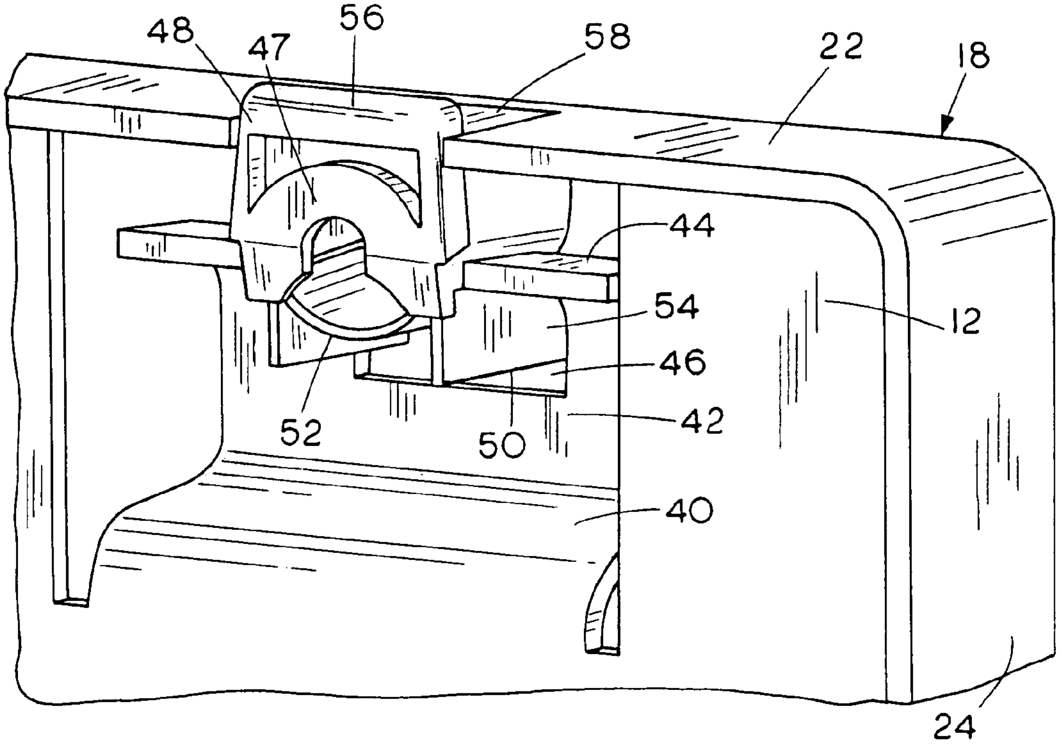
FIG. 2 is a rear view of the adapter base plate with the cover plate in position and a latch arm in closed position.
Figure 4:
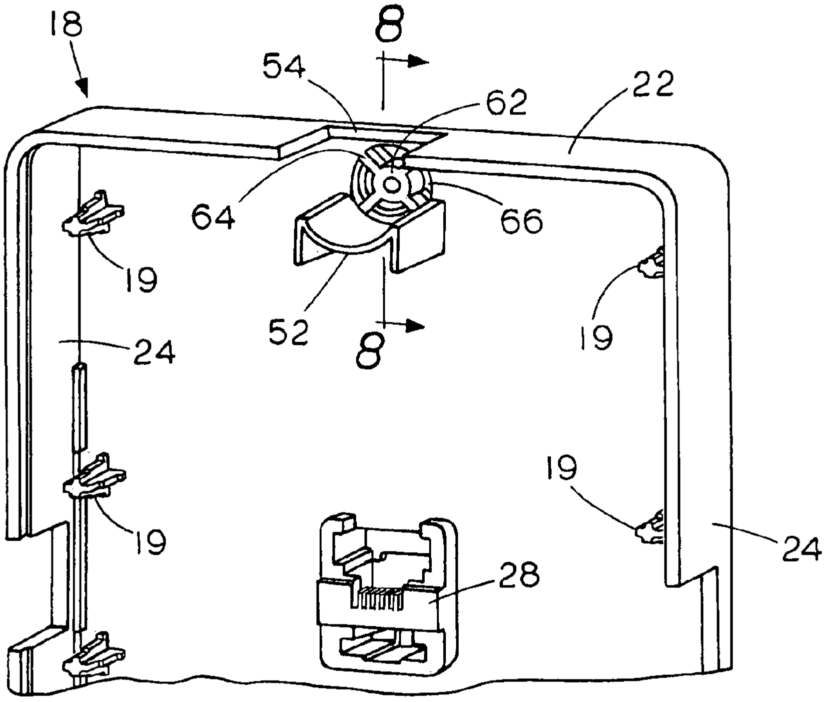
FIG. 4 is a schematic fragmentary rear view of the adapter cover used in the present invention.
Figure 5:
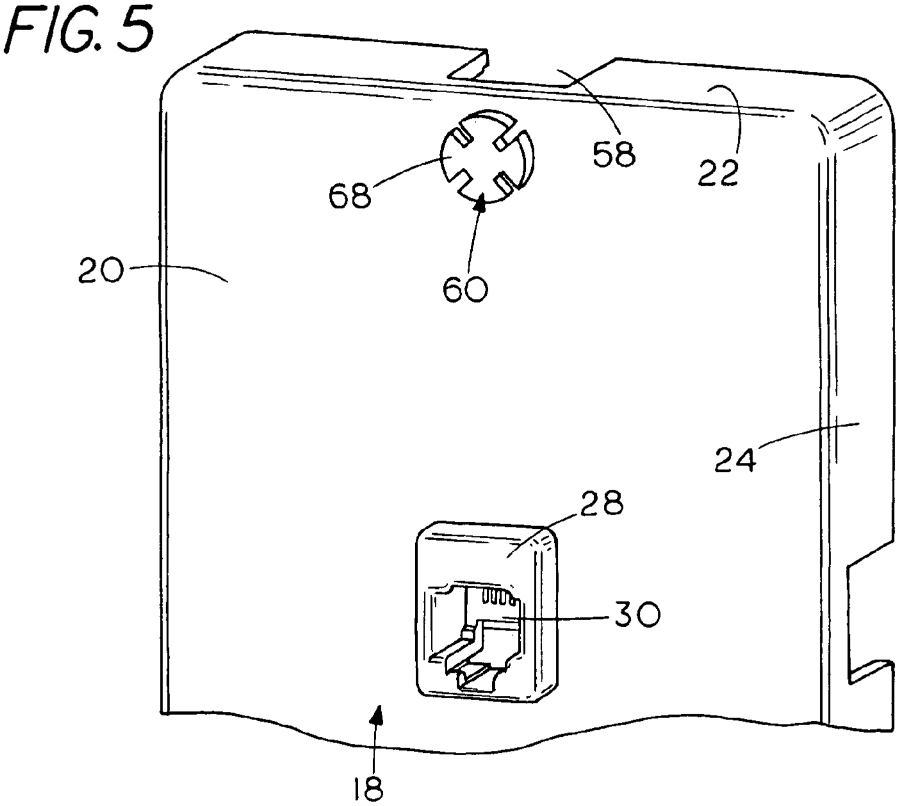
FIG. 5 is a fragmentary front view of the cover shown in FIG. 4.

In FIG. 1, the adapter jack assembly indicated generally at 10, as shown, is made up of two major mounting parts, including a base plate 12. The base plate 12 can be latched to the studs 13 (top and bottom, but only the top is shown) of an existing wall mounted phone jack plate or box 15. The existing plate 15 is secured to a wall 17. The adapter includes a cover plate 18 that has molded retainer pins 19 on its back side (FIG. 4) that slip into sleeves 16 and retain the cover 18 on the base 12. As can be seen the cover has a front panel 20, a top wall 22, and side walls 24. A jack 26 is supported on the base plate 12 in a desired manner, and a jack opening housing 28 is provided on the front wall 20 of the cover.

The jack opening shown at 30 is configured to receive a plug that will fit into the jack 26. The jack 26 is part of a printed circuit board 27 that carries a DSL line filter. The line filter circuit is connected to a plug on the rear side of the base that plugs directly into a jack on phone plate 15. The output jack 26 is thus a filtered line for connection to a telephone and a computer peripheral. The PC board 27 is supported on the base plate 12 in a known matter, such as with screws or the like.

The base plate 12 has a support portion 32, for supporting jack 26 and its circuit board 27 in a desired location and position. In addition, at both the top and the bottom of the base plate 12, a hinging latch assembly 38 is provided. The latch assembly 38 molds into the wall plate 32, and has a resilient mount formed with a molded flange 40 that extends out from the wall plate, and the mount includes an upright wall portion 42, and a reverse flange 44 so that it makes a generally inverted U-shape when viewed from the front as shown in FIG. 1.

Figure 3:
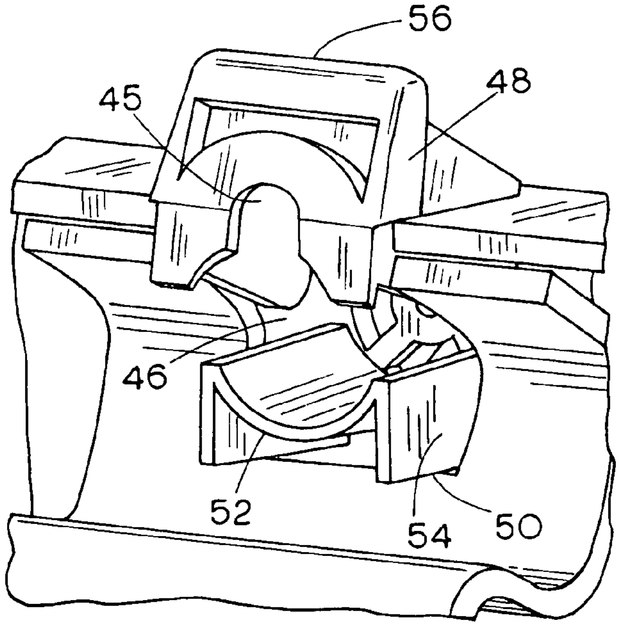
FIG. 3 is a rear fragmentary view of the adapter showing the latch arm in an open position wherein it can be fitted over a phone mounting stud.
Figure 8:
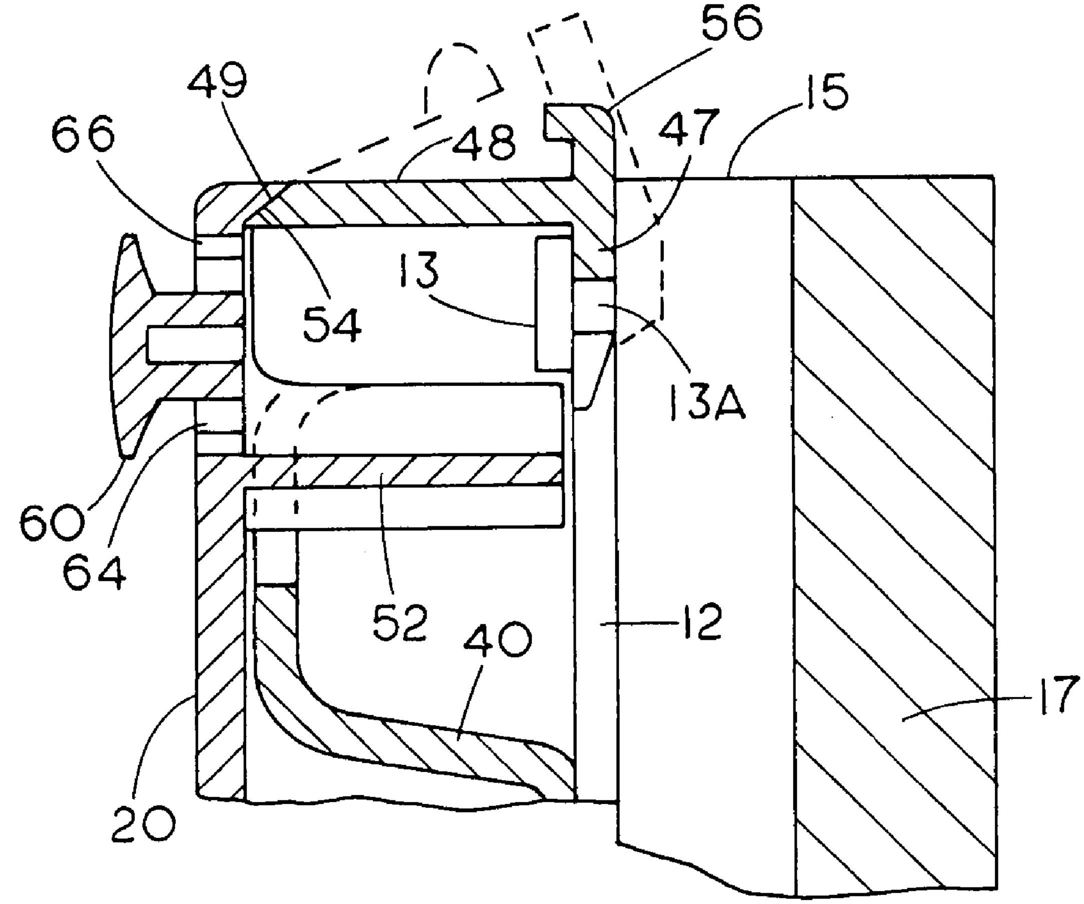
FIG. 8 is a fragmentary sectional view showing the adapter in position on an existing telephone mounting stud on a wall.

This forms a spring hinge for the latch. The wall 42 has an aperture 46 that provides clearance for a guide 52 on the rear of the cover. The latch housing 48 is secured to the top wall 44 of the flexible resilient hinge. The latch housing has a wall 47 that has a recess 45 that fits over the shanks 13A of existing studs 13 (top and bottom) for holding the base plate 12 in place. As can be seen in FIGS. 3 and 8 for example the latch and the top wall can both be flexed or pivoted, for latching action. The corner edge 49 of the latch 48 opposite from wall 47 has a rounded, concave recess formed, which forms a pivot surface for the latch against a rounded convex edge 54 of an opening 58 in wall 22 of the cover 18.

The cover includes wall 52 protruding from the back surface, to provide a guide through opening 46. As seen in FIG. 8, the edge 54 engages the concave edge 49 of the latch 48 to form a pivot axis for pivoting or hinging the latch 48 to its position, as shown in FIG. 3. In that position, the wall 47 of the latch is raised so it can slide over stud 13.

Figure 6:
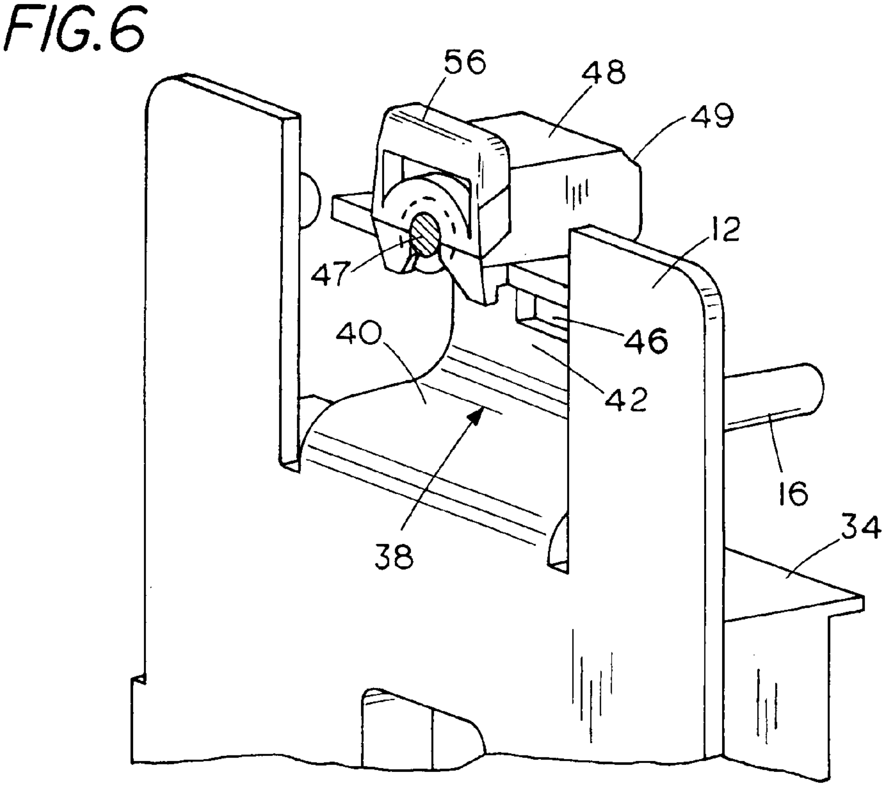
FIG. 6 is a rear view of the mounting plate or base.
Figure 7:
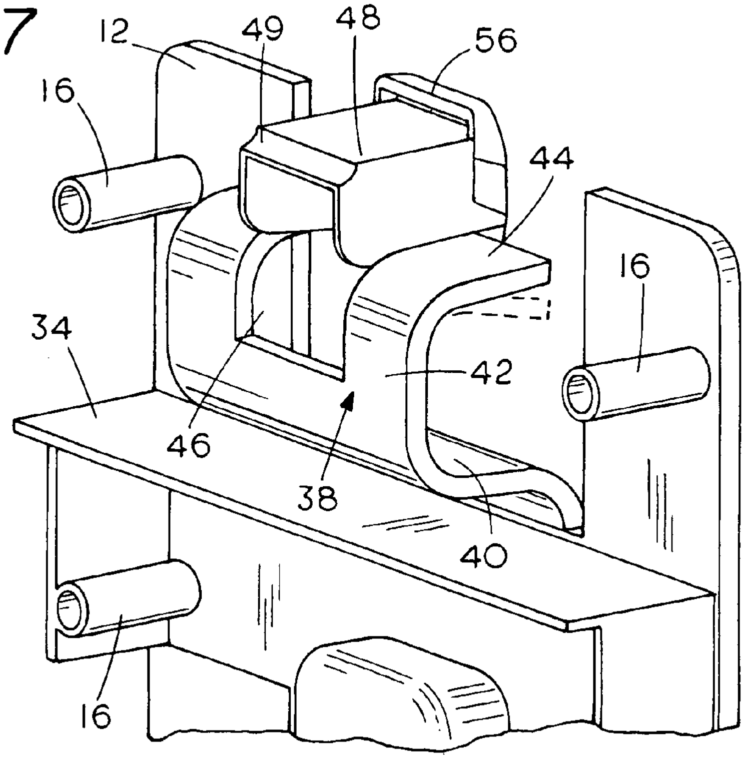
FIG. 7 is a front view of the mounting plate or base shown in FIG. 6.

Installation is made by attaching the cover to the base plate 12, if desired, after printed circuit board and the jack have been put into place on the base. The latch 48 can be pivoted about the edge 54 on the recess of the cover, as shown in FIG. 8. The latch raises upwardly as shown in FIG. 3 (or downwardly for the lower latch) so the wall 47 is behind the head of stud 13 so the shank of stud 13 slips into the recesses 45. The upper edge of recess 45 is raised, using a finger tab 56, on the latch. The adapter 10 is slid adjacent the existing plate 15. The latch 48 then can be moved to overlie the shank of stud 13 and moved to a closed position trapping the head of stud 13 behind wall 47 as shown in FIGS. 6 and 8. The latch will spring to closed position to secure the base. Again, there are latches at both the top and bottom of the base plate 12.

In addition, the cover 18 is provided with a molded in support stud 60 for supporting a telephone having a keyhole slot, such as that shown in U.S. Pat. No. 4,411,485, the showing of which is incorporated by reference. The telephone has keyhole openings in the back, and studs 60 are provided at both the top and the bottom of the cover 18 so that there are two studs 60 holding the telephone in place when it is latched onto the cover, with a plug on the telephone engaged in the output jack on the cover. As can be seen, in FIG. 4 the stud 60 has a central support 62, and includes web arms 64 that are molded to edges of an opening 66, so that the head 68 of the molded stud 60 can be molded in place when cored from the back.

FIG. 8 illustrates the stud 60 in place with its head 68 positioned outwardly from the outer surface of the front wall 20 of the cover.

The assembly has molded in studs at the top and bottom of the cover, (the cover is symmetrical from top to bottom) as well as molded in latches on the base plate.

This eliminates several metal parts, that are normally used, and eliminates the need for sliding latches for holding a base in place on an existing wall plate.

Figure 9:
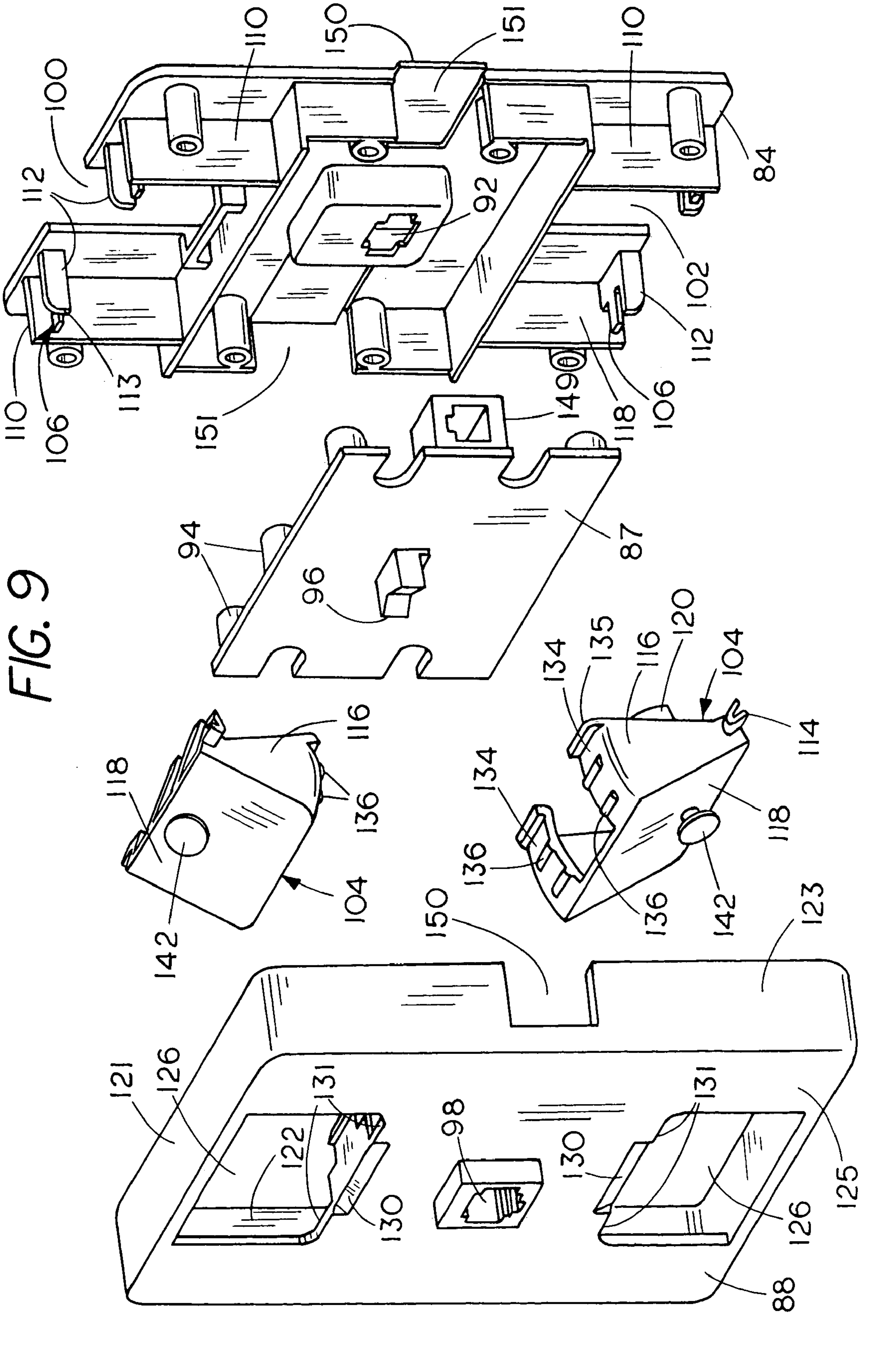
FIG. 9 is a front exploded view of a modified form of the DSL Adapter wall jack that attaches to an existing wall mounted jack plate.
Figure 10:
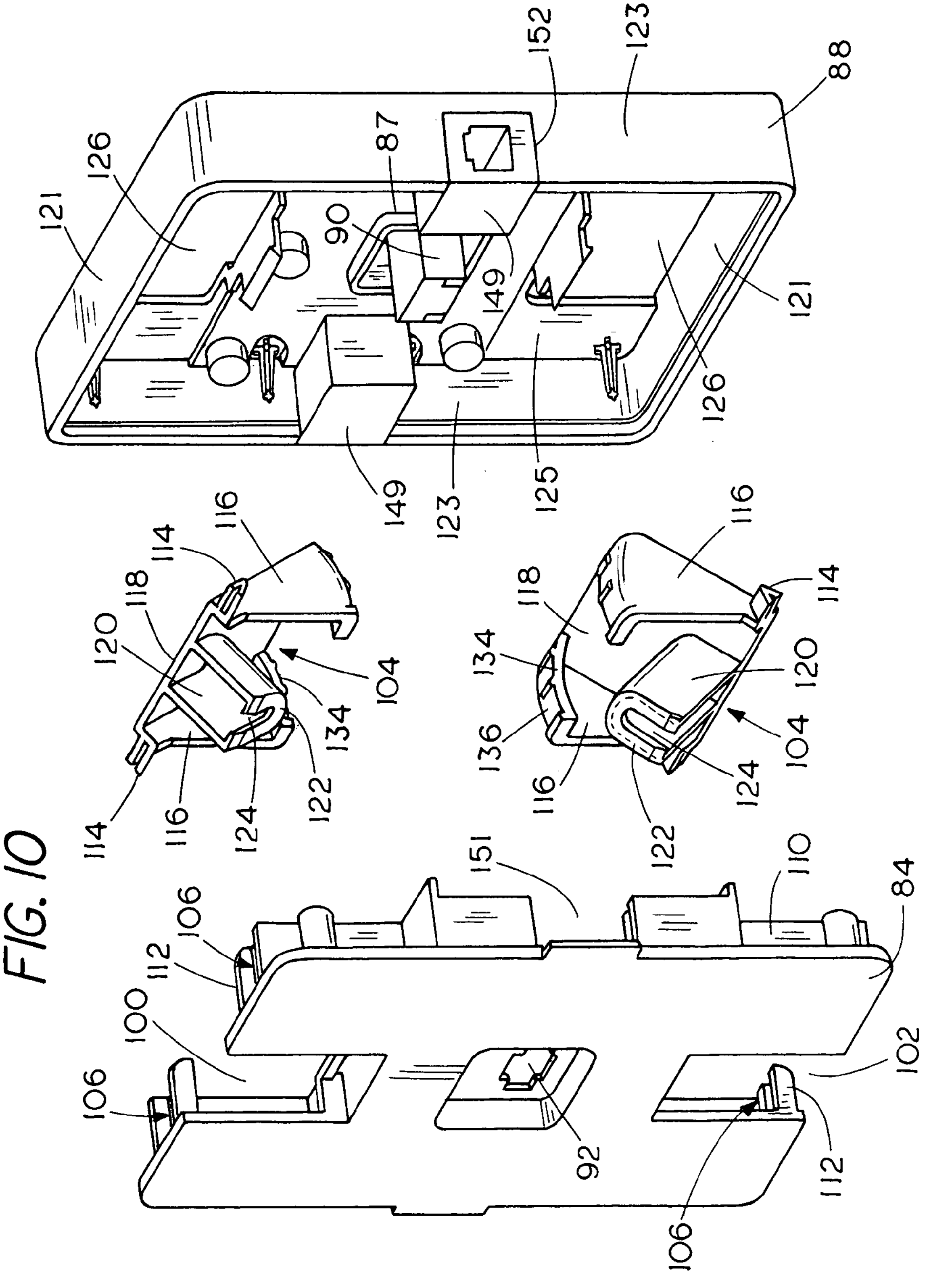
FIG. 10 is a rear exploded view of the DSL adapter of FIG. 9.

A modified form of the present invention is shown in FIGS. 9–14 and referring to those Figures, a DSL adapter jack, is shown exploded in FIGS. 9 and 10 at 80, and is made of substantially the same parts as the first form of the invention. A circuit carried by the adapter jack operates in substantially the same way as the first form of the invention. The adapter jack 80 is made up of two major mounting parts including a base plate 84, that will pivotally mount latch assemblies so that the adapter can be latched onto the studs of a wall mounted jack plate, for example, the one shown at 13 in FIG. 1, and in other views. The mounting studs are on an existing wall mounted phone plate or box. The adapter has a cover plate 88 that will mount onto the base plate and be held in place.

In this form of the invention, as well, a circuit board 87 is mounted onto the base plate 84, when assembled, and it has a plug that is just schematically shown at 90 in FIG. 10 that will fit through an opening 92 in the base plate 84 and will be used for plugging into the existing jack on a kitchen wall plate or the like. The circuit board 87 will then be connected in the telephone line, and the DSL filter circuit components 94 on the circuit board 87 will be in the line. The circuit board 87 also carries a jack on the output side indicated at 96, which will align with a jack opening 98 on the cover 88, and will receive a plug from a telephone line for use on DSL connections for computers, as well as telephone connections.

In this form of the invention, the base plate 84 has open ended recesses 100 at the top, and 102 at the bottom, that are aligned with the studs on a wall plate to which a telephone can be attached. Pivoting stud latches 104 are provided to engage studs from an existing wall plate passing through these openings. The same number is used on both the top and bottom stud latches, because one is merely inverted from the other one on the base plate 84.

The pivoting stud latches 104 are supported for pivotal movement on open pivot channels 106, which are positioned on opposite sides of the openings 100 and 102. These pivot channels 106 are formed with divider walls 110 on one side, and then shorter inner walls 112. A base wall 113 can be seen in FIG. 11, from a top view.

The channel open sides face outwardly, that is, the top channels 106 are opened upwardly and the bottom channels 106 are opened downwardly. The pivoting stud latches 104 are provided with a pair of pivot ears 114, which are supported on and extend laterally from side walls 116 of the latches 104. The pivot ears 114 are offset so they will fit into the ends of the channels 106. The stud latches 104 also have a base wall 118 that is an exterior surface when the adapter jack is in position on a wall. The pivoting stud latches 104 carry U-shaped open top housings 120 (see FIG. 10) that have end walls 122 with generally U-shaped openings 124 therein. The end walls 122 form a flange or collar around openings 124. The U-shaped openings 124 are for the same purposes as the openings 45 in the first form of the invention, and they are made so that they will receive the shank portions of the studs on a wall plate, and with the head on the interior between the side walls of the housings 120. The mounting stud head is held in the housings 120 by the wall or flange 122. The housings 120 are integral with the face wall 118 of the pivoting stud latches 104.

Figure 11:
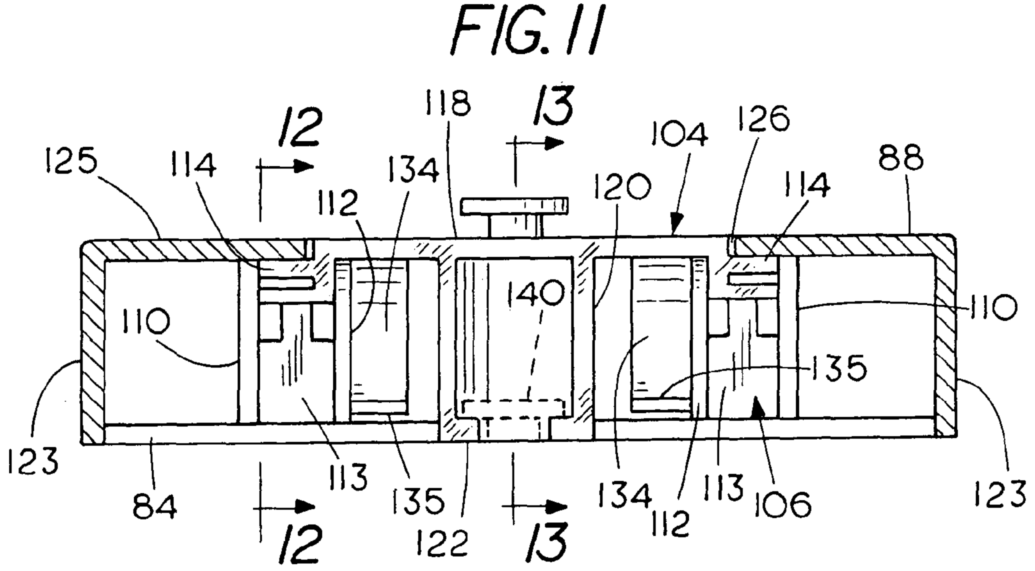
FIG. 11 is a top view with the upper wall of a cover removed for illustrative purposes.

The pivot ears 114 will be received in the pivot channels 106, and rest on the base walls 114, between the walls 112 and end portions of walls 110, generally as shown in FIG. 11.

The cover 88 fits over the base wall 84 and the DSL circuit board 87, which is supported on suitable guides on the base wall, and fits over the pivot ears 114 of the pivoting latches 104. End walls 120 of the cover will retain the pivot ears 114 in place in channels 106.

The cover 88 is latchable in place to overlie the base 84. The cover, as can be seen, has end walls 121, and side walls 123. In addition, the cover has a front wall 125. The cover front wall 125 has openings 126 at the top and bottom that are of size so that the front walls 118 of the pivoting stud latches 104 fit within those openings. In addition, it can be seen that the lower edge of the upper opening 126 and the upper edge of the lower opening 126 have tapered sections 130 that are used for prying the latches 104 to start them pivoting.

The pivoting stud latches 104 have part annular guide walls or tracks 134 on the ends of the side walls 116 opposite from the pivot ears 114, and these walls 134 act as guides, and include detent ridges 136 in position to engage the side edge sections 131 on the lower edge of the upper opening 126 in the cover and the upper edge of the lower opening 126 to detent the stud latches 104 in a closed position and also in an open position by engaging or rubbing against the side edge sections 131 on opposite sides of the tapered section

130. Additionally, the walls or tracks 134 have raised lips 135 that will act as stops to provide for stopping of the outward pivoting of the pivoting stud latches when the latches are put into their position for receiving the studs on an existing wall plate.

It can be seen that the side walls 116 are tapered from the pivot ears 114 to the guides 136.

Figure 12:
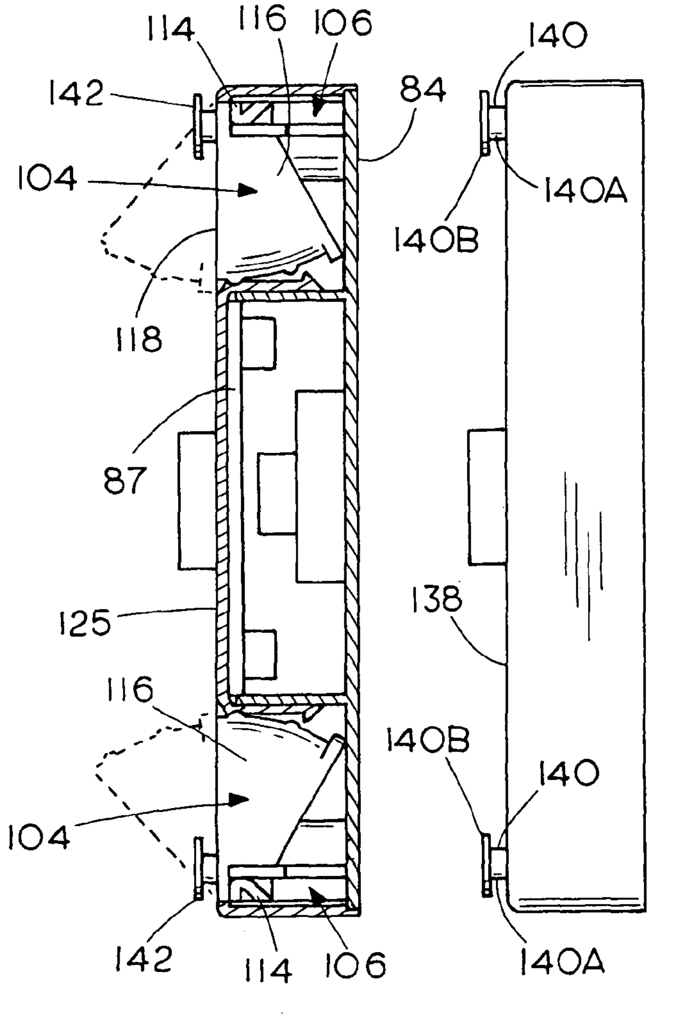
FIG. 12 is a sectional view taken as on line 12—12 in FIG. 11.

Referring to FIG. 12, it can be seen that the base plate 84 is adjacent to an existing wall plate 138, shown schematically, which has conventional mounting studs 140 thereon. The studs 140 have shanks 140A and heads 140B. The base plate 84 is shown in cross section, and the pivoting latches 104 are illustrated in solid lines in position where they would be latched onto the studs 140. The dotted line positions of FIG. 12 show the pivoting stud latches 104 pivoted outwardly, with the pivot ears 114 permitting this pivoting. There is a stud 142 on the outside wall or surface 118 of each of the pivoting stud latches 114.

Figure 13:
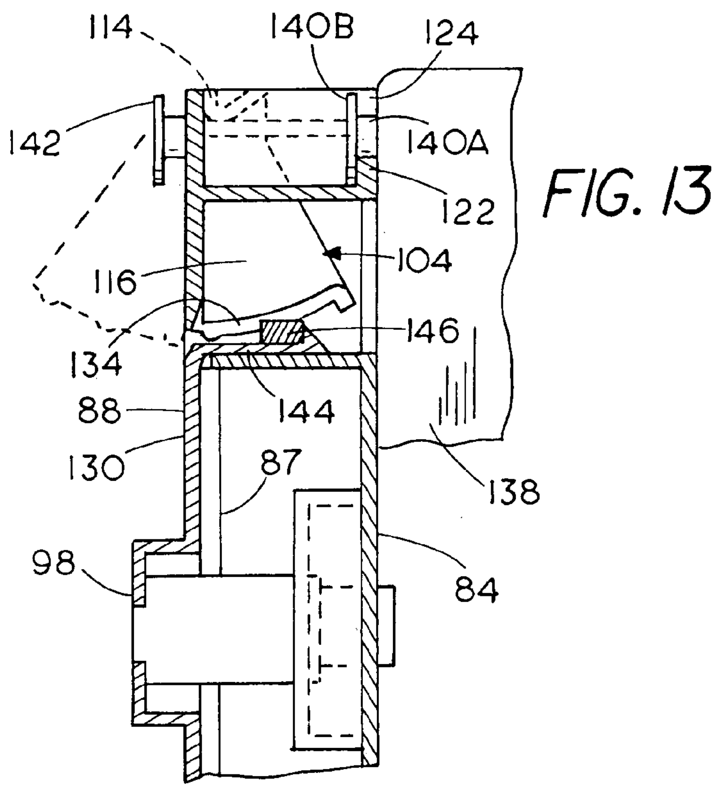
FIG. 13 is an enlarged sectional view taken as on line 13—13 in FIG. 11.

FIG. 13 is a view through the center of the pivoting stud latches, and is somewhat enlarged. It shows the retainer or housing 120 in position with the wall member 122 around the shank 140A of the stud 140, and the cover front wall 130 in position. The front wall of the cover has a lock member 144 that will slip into a retainer 146 that is mounted on the base plate 84, and when the lock member slips into place, it locks the cover 88 onto the base plate 84 so that the pivot ears 114 are held in place and the pivoting stud latches can rotate between the dotted line position shown in FIGS. 13 and 14 and the solid line position wherein it is latched onto a stud 140.

The recess 124 in the housing 120 is illustrated in FIG. 13 as well, and the detent lugs 136 that will engage the edges 131 are shown on the guides or tracks 136. Additional catches can be used for holding the cover in position on the base plate, if desired.

The pivoting stud latches 104 are pivoted to their open positions shown in dotted lines, and then the base plate and cover assembly, which will be put together before placing the DSL adapter onto a wall plate, are moved up against the wall plate, with the end walls 122 of the retainers or housings 120 down below the studs on the existing wall plate. The base plate 84 is placed up against the surface of the existing wall plate and the studs 140 are on the inner side of the base plate 84. The housing 120 of the pivoting stud latches are clear of the heads 140B. The pivoting stud latches 104 are then pivoted to their solid line, locked position and the walls or collars 122 slip behind heads 140B and the shanks 140A slide into the openings 124. The solid line, locked positions are shown in FIGS. 12 and 13, as well as in FIG. 14.

Figure 14:
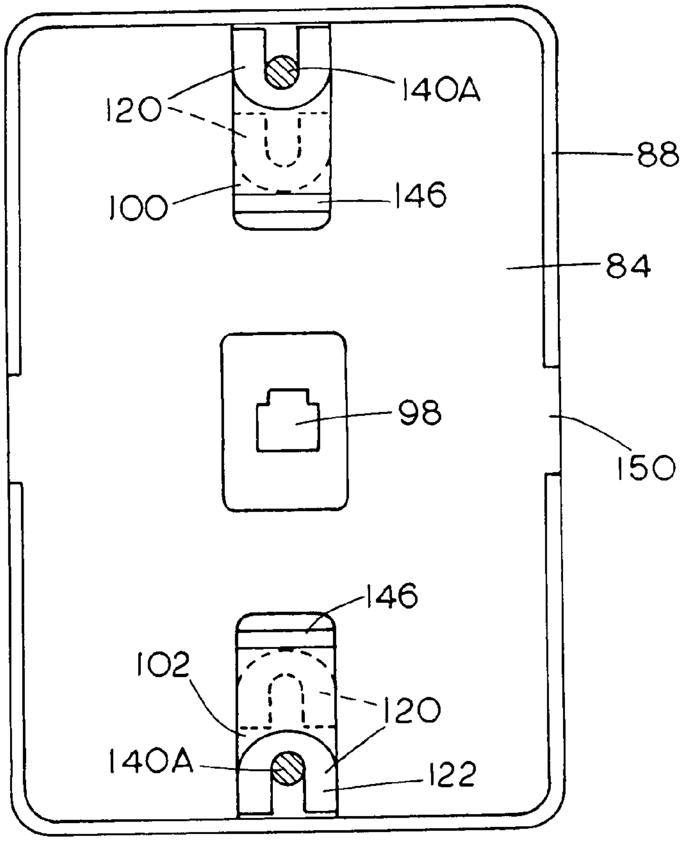
FIG. 14 is a rear view of the DSL adapter of FIG. 9.

FIG. 14 is a back view of the base plate 84, and the cover plate 88 is in position around the base plate. The DSL filter circuit board has side jack housings 149 that fit into openings 151 in the side walls of the base plate and recesses or openings 152 on the side walls 123 of the cover, so more than one plug can be connected to the circuit. The plugs 149 are accessible from the sides of the adapter. Suitable guides 150 on the base plate will fit into openings 152 on the side walls 123 of the cover 88.

Assembly of the base plate, cover plate, and circuit board are easily installed to provide for a DSL filter through the existing telephone lines. The output jack accessible through opening 98 can easily be put into place as well.

Although the present invention has been described with reference to preferred embodiments, workers skilled in the art will recognize that changes may be made in form and detail without departing from the spirit and scope of the invention.

What is claimed is:

1. An adapter for attachment to an existing wall mounted jack plates for communication jacks having a pair of mounting studs on an outer surface thereof, the studs including shanks and heads of larger diameter than the shanks, said adapter comprising an adapter housing, the adapter housing including a base plate and a cover, a pair of pivoting stud latches, the stud latches comprising latch housings, the latch housings each having an end wall with an open ended slot of size to receive the shank of a mounting stud and of smaller width than the head of a mounting stud on an existing wall mounted jack plate, the latch housings being pivotally mounted to said adapter housing for pivoting about an axis parallel to the base plate of the adapter housing and spaced from the end wall of the respective latch housing so the end walls move in arcs as the latch housings are pivotally movable from an open position wherein the adapter housing can be placed against an existing wall mounted jack plate when the latch housings are aligned with a respective mounting stud of such existing wall mounted jack plate, and being pivotable to a second position wherein the respective end wall moves over a head of a respective mounting stud and wherein the slots of the end walls fit over a respective shank of a stud on such existing wall mounted jack plate to secure the adapter housing to the wall mounted jack plate, the arcs of movement of the end walls of the latch housings being such that the end walls clear the heads of the respective existing studs as the adapter housing is placed against an existing wall mounted jack plate and as the latch housings are moved to their second positions.

2. The adapter of claim 1, wherein said housing includes a circuit board for connecting to a jack on the wall mounted jack plate, and connected to adapter housing output jacks on the adapter housing.

3. The adapter of claim 2, wherein said circuit board carries a filter circuit for DSL connections.

4. The adapter of claim 1, wherein said latch housings are mounted on flexible supports integrally molded with the base plate that permits pivotal movement of the latch housings.

5. The adapter of claim 4, wherein said adapter housing carries studs replicating the position of the studs on the wall mounted jack plate.

6. The adapter of claim 1, wherein said latch housings have pivot members on opposite sides thereof, the adapter housing having pivot supports for receiving the pivot members, the latch housings being pivotally mounted for movement outwardly of the cover through provided openings to change the position of the end walls to permit placing the base plate against the existing wall mounted jack plate.

7. The adapter of claim 6 wherein there are detents on the pivot connections for holding the latch housings in their second positions and an open position.

8. The adapter of claim 7 and releasable connectors for holding the cover on the adapter base plate.

9. An adapter for providing a connector in a telephone line for use with DSL connections that mounts onto existing telephone mounting studs on a wall mounted jack plate, the studs being at first and second ends of the wall mounted jack plate and having stud shanks and stud heads larger then the stud shanks, the stud heads being spaced from an outer surface of the wall mounted jack plate, the adapter comprising an adapter housing, said adapter housing having a back plate and a cover to form an interior space, a circuit board mounted in said adapter housing having a connection to a telephone jack on the existing wall mounted jack plate, and at least one output jack for connection of a telephone line, a pair of latches pivotally mounted on the adapter housing positioned to be latchable with the studs, respectively, the latches each comprising a latch housing having an end wall with an open ended slot of size to receive the stud shank of a respective stud and the slot being smaller in width than the respective stud head, the latch housings being pivoted to the adapter housing about axes spaced a sufficient distance from the end walls so the end walls are raised clear of the respective stud head in a first pivoted position of the latch housings, wherein the back plate can be placed against the existing wall mounted jack plate without interference from the studs on the wall mounted jack plate to a position wherein the slots in wherein the end walls of the latch housings receive the stud shanks on the existing wall mounted jack plate with the back plate against the existing wall mounted jack plate, and the end walls are trapped between the stud heads and the existing wall mounted jack plate, and the adapter housing carrying second studs that replicate the positions of the studs on the existing wall mounted jack plate.

10. The adapter of claim 9, wherein said pivotal mounting for the latches comprises a flexible hinge member.

11. The adapter of claim 9, wherein each of said pivoting latch housing has spaced side walls joined to the end wall and has pivot members extending laterally from the side walls, and pivot supports the back plate for receiving the pivot members and permitting pivotal movement of the latch housing.

12. The adapter of claim 11, wherein said adapter housing has openings of size to receive front walls of the respective latch housings, and when the adapter housing is mounted on the base plate, the front wall of the latch housings being exposed through the openings, and the second studs replicating the position of the studs on the existing wall mounted jack plate being on the front walls of the respective latch housing.

13. The adapter of claim 12, and detents for holding the pivoting latches in a closed position.

* * * * *